United States Patent [19]

Nelson

[11] 4,452,230
[45] * Jun. 5, 1984

[54] CANOPY SYSTEM FOR A BUILDING STRUCTURE

[76] Inventor: Richard C. Nelson, 31 Sunrise Crescent, Pointe Claire, Quebec, Canada

[ * ] Notice: The portion of the term of this patent subsequent to Apr. 5, 2000 has been disclaimed.

[21] Appl. No.: 152,809

[22] Filed: May 23, 1980

[51] Int. Cl.³ .............................................. F24J 3/02
[52] U.S. Cl. .................................. 126/431; 126/426; 126/444; 52/2; 47/17
[58] Field of Search ............... 126/426, 431, 442, 443, 126/450, 429, 444; 52/2, 63, 81; 47/17

[56] References Cited

U.S. PATENT DOCUMENTS

| | | | |
|---|---|---|---|
| 3,666,174 | 5/1972 | Brylka et al. | 52/2 |
| 3,828,501 | 8/1974 | Haskins | 52/2 |
| 3,841,039 | 10/1974 | Farnsworth | 52/81 |
| 3,965,546 | 6/1976 | Hickle | 52/2 |
| 4,004,380 | 1/1977 | Kwake | 52/2 |
| 4,036,209 | 7/1977 | Press | 126/426 |

FOREIGN PATENT DOCUMENTS 1550488  8/1979  United Kingdom ..................... 52/2

*Primary Examiner*—James C. Yeung
*Assistant Examiner*—Lee E. Barrett
*Attorney, Agent, or Firm*—Larson and Taylor

[57] ABSTRACT

A canopy system for a building structure is disclosed which may be utilized with a climate control system within a building. The canopy system has at least one tubular panel formed of flexible impermeable sheet material, the panel including an open ended hollow sleeve with two side walls, a top exterior sheet and a bottom interior sheet being joined sealed and having supports at the joins between the side walls and the top and bottom sheets. The top and bottom sheets extend across and are supported by the supports at each side of the panel by the building structure, one supported side of the panel being at a higher elevation than the other supported side of the panel, each end of the open ended hollow sleeve joined to a manifold system adapted to control pressure within the panel, and a liquid feed pipe within the panel at the supported side of the panel having the higher elevation.

17 Claims, 10 Drawing Figures

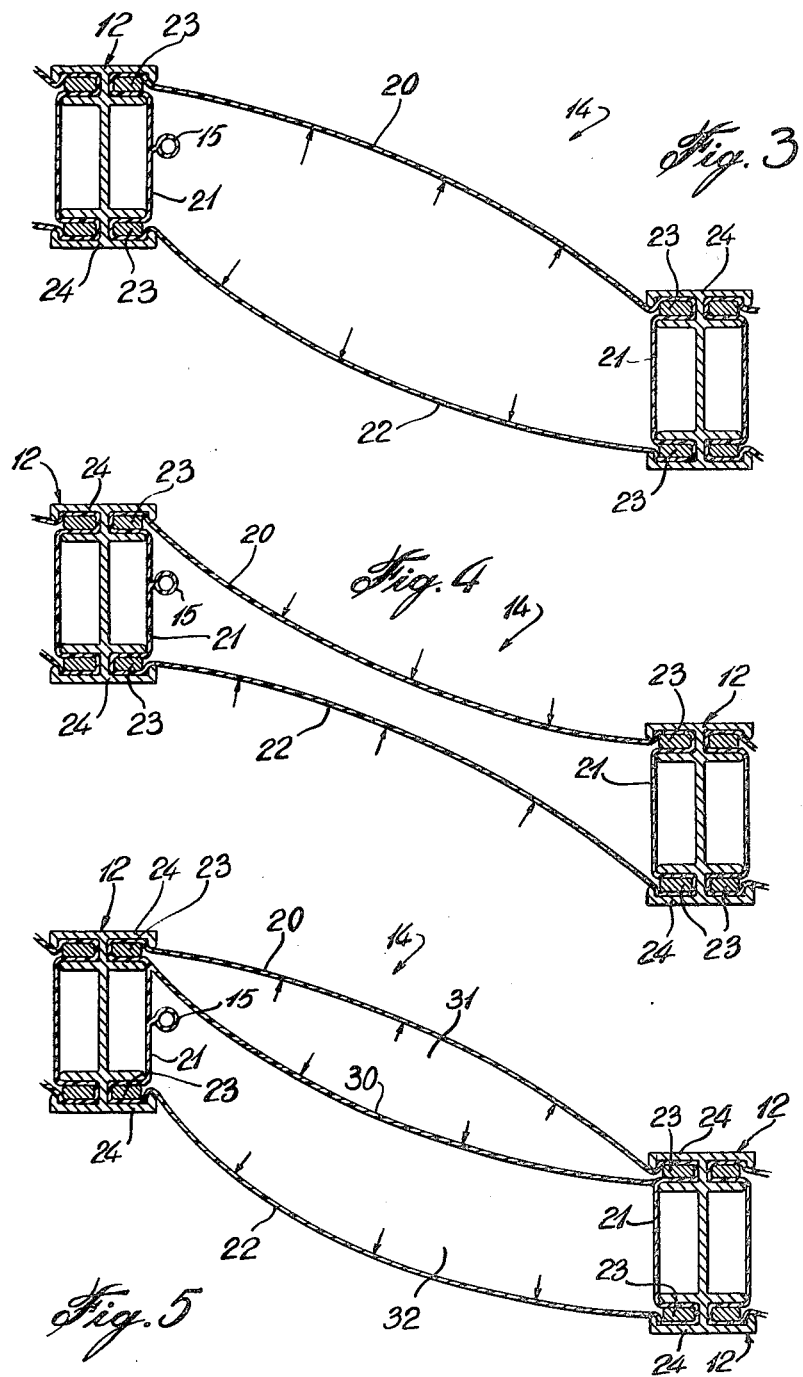

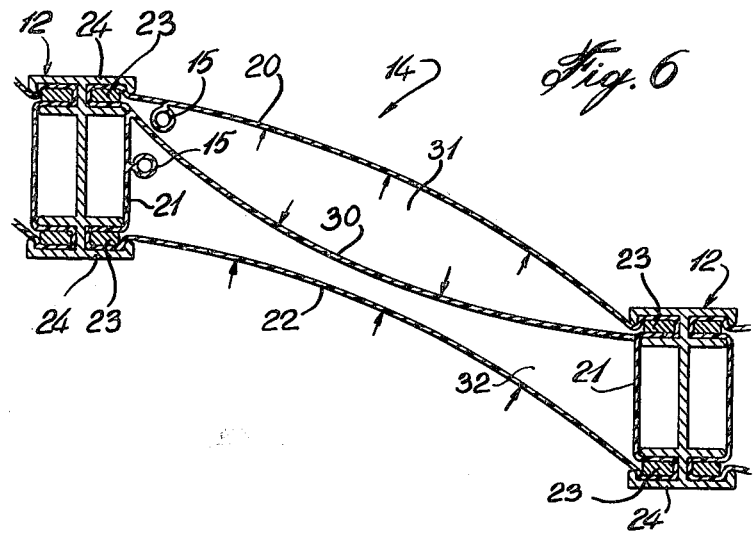
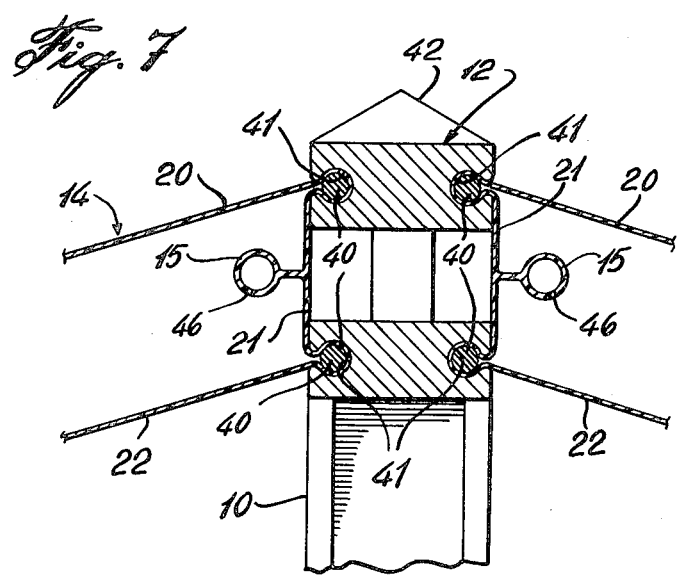

CANOPY SYSTEM FOR A BUILDING STRUCTURE

The present invention relates to a building structure, more specifically to a canopy system to form a roof for a building structure. The canopy system has one or more panels each having an impervious top layer and a bottom layer and a controlled pressure within the panel.

Structures having flexible roof canopies have been made in the past. The majority of these have a canopy supported by pressure within the building or structure. Other canopy systems include awnings and tents which stretch across a frame or building structure. Transparent roof canopies have been considered for structures such as greenhouses and the like, however, these are usually temporary buildings or in the case of greenhouses, smaller buildings and are designed to allow light and the ultraviolet radiation from the sun inside the building.

The present invention provides a novel concept with two layers or sheets, a top exterior sheet and a bottom interior sheet stretched between two elements of a building structure and then controlling the atmosphere within these two layers. This is achieved by forming the two layers into a hollow sleeve, sealed at the sides, supported at each side by the building structure. A manifold system is provided at each end of the sleeve which forms part of a closed air circuit, including fans, precipitators, and heat exchangers which controls the pressure, temperature and humidity of the air circulating in the sleeve. To assist in the control of the environment within the sleeve, water and other liquids may be sprayed into the sleeve, to evaporate and provide cooling within the panel. The control of the environment within the panel may be incorporated with a climate control system within the building. Such a system can conserve energy and have ecological benefits by utilization of waste heat from industrial processes. The canopy system of the present invention can be used integrally with a system of controlling environment within a building for summer and winter operation.

Canopy systems are light-weight and economical especially when made of coated fabrics, however, they have certain limitations. They do not have the same strength as rigid materials and they must be stabilized against wind loads and other factors such as snow loads. Large area canopies are difficult to fabricate because they must be piece made requiring accurate cutting, sewing, and sealing of seams. When the canopies are completed, a large bulk of material results. Typical tent and dome-like canopy applications require the canopy to have a double curvature which does not lie flat when the canopy is folded or rolled for shipping. Furthermore, a system comprising a number of smaller area panels poses problems of forming weather tight connections at the site.

In the canopy system of the present invention, tubular panels are made in the form of a continuous sleeve which may be cut to length in the field and installed to the structure. There is no need to sew and seal seams, and the sleeve is delivered to the site in a roll. The material used for the sleeve of the present invention is either a flexible impervious film or fabric. The film may be extruded in a sleeve or tube and the fabric may be woven in a sleeve or tube.

The present invention provides a canopy system for a building structure comprising at least one tubular panel formed of flexible impermeable sheet material, the panel including an open ended hollow sleeve with two side walls, a top exterior sheet and a bottom interior sheet being joined, sealed and having support means at the joins between the side walls and the top and bottom sheets, the top and bottom sheets extending across and supported by the support means at each side of the panel by the building structure, one supported side of the panel being at a higher elevation than the other supported side of the panel, each end of the open ended hollow sleeve joined to a manifold system adapted to control pressure within the panel, and liquid feed means within the panel at the supported side of the panel having the higher elevation.

In other embodiments of the invention the manifold system at each end of the hollow sleeve may form part of a closed air circuit and include a fan or other air-moving means, heat exchanger means and a precipitator within the air circuit. The top exterior sheet of the hollow sleeve may be formed from material which allows the transmission of solar energy to the panel and in another embodiment the bottom interior sheet may also be formed from material which allows transmission of the solar energy through the panel and inside the building structure. In yet a further embodiment the bottom interior sheet has a selected light transmission to suit the light requirements inside the building structure.

In a still further embodiment the hollow sleeve of the canopy system may be formed from a tubular film of thermoplastic material such as polyethylene or polyester. Alternatively the sheet material may be formed from a synthetic fabric having an impermeable coating thereon such as a loose plain woven polyester fabric with a flexible silicone coating. In one embodiment, a hose having a plurality of holes along its length is connected to the fabric material of the tubular sleeve at the side of the panel being at the higher elevation. The support means wherein the side walls are supported by the structure may comprise a cord at each of the joins woven into the fabric forming the tubular sleeve, each cord in turn is supported in a fluted slot which is part of the building structure.

A liquid drain pipe is located within the panel at its lowest elevation in an embodiment where a drain is required. Either a positive pressure or a negative pressure may be maintained within the panel and in required situations an additional sheet may be located between the top exterior sheet and the bottom interior sheet to provide two hollow sleeves and therefore two pressurized spaces within the same panel.

The canopy system may be formed by a plurality of tubular panels supported side by side by the building structure. The sides at the higher elevation of adjacent panels may in one embodiment be contingent with each other and the sides at the lower elevation of adjacent panels may also be contingent with each other. The building structure has elements which support the sides at the higher elevation of adjacent panels and other elements which support the sides at the lower elevation of adjacent panels to form a roof with peaks and troughs. In another embodiment the side at the higher elevation of one panel is contingent with the side at the lower elevation of an adjacent panel. The building structure has elements each of which supports the side at the higher elevation of one panel and the side at the lower elevation of an adjacent panel to form a roof of constant slope in which the panels transverse the slope.

In drawings which illustrate embodiments of the invention,

FIG. 3 is a sectional view of a building panel having a positive pressure therein.

FIG. 4 is a sectional view of a building panel having a negative pressure therein.

FIG. 5 is a sectional view of a building panel having an additional sheet to provide two hollow sleeves both of which have a positive pressure therein.

FIG. 6 is a sectional view of a building panel having an additional sheet to provide two hollow sleeves one of which has a positive pressure and the other a negative pressure therein.

FIG. 7 is a partial sectional view of the building structure shown in FIG. 1 illustrating the peak of the roof supporting the sides at the higher elevation of two panels.

Figure 1:
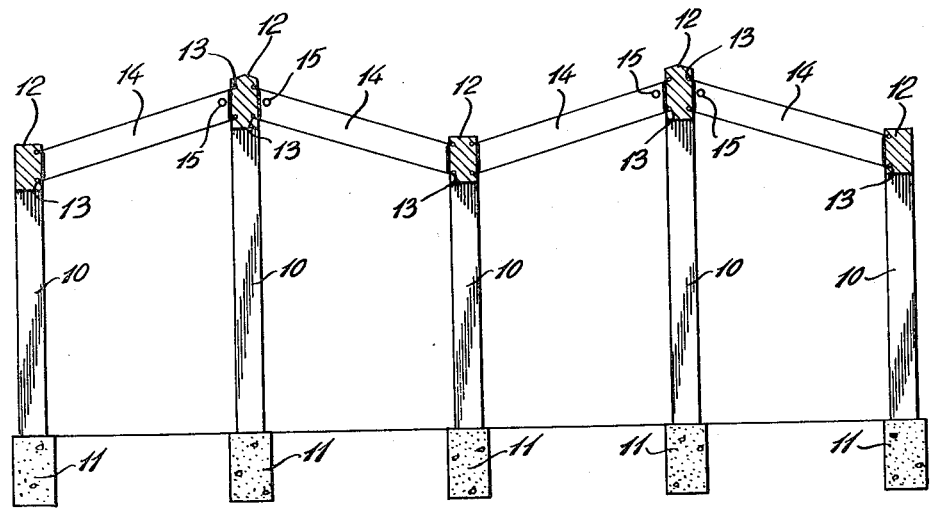
FIG. 1 is a schematic elevational view of one embodiment of the canopy system according to the present invention.

One embodiment of a building structure is shown in FIG. 1 wherein columns 10 having foundations 11 support special beam sections 12 which have connections 13, described in more detail hereinafter, for supporting tubular panels 14 between each beam section 12 as may be seen. The columns 10 are arranged so that every other supporting beam section 12 is at a higher elevation than the intermediate beam section, thus a roof is formed with peaks and troughs. At the peaks inside each panel 14 is a hose 15 which has a plurality of holes along its length to provide liquid into the interior of each panel. The liquid, preferably water, entering the panel either evaporates in the panel or alternatively flows to the lower side of each panel and consequently drains either into the manifold at the end of the tubular panel or alternatively a drain pipe may be provided at the lowest point inside the panel 14.

Figure 2:
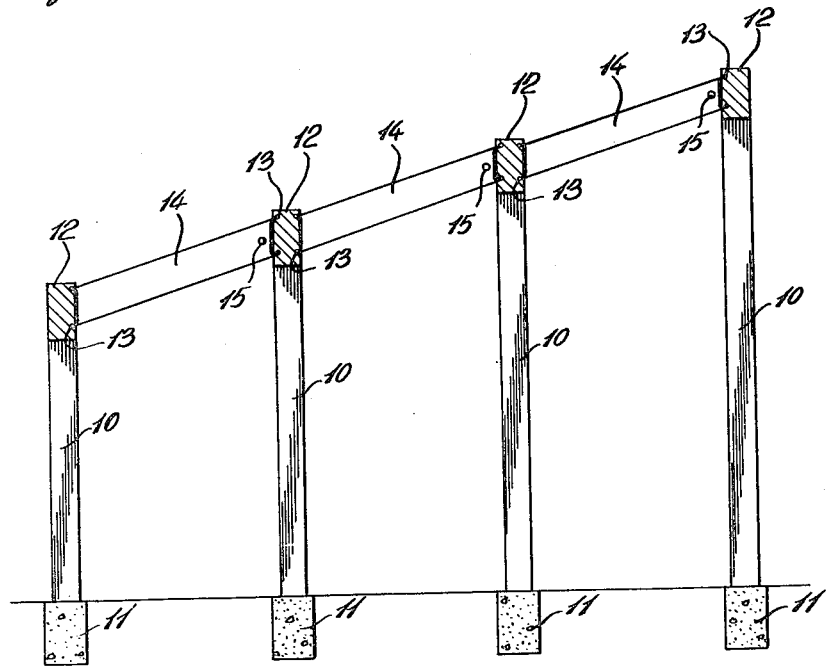
FIG. 2 is a schematic elevational view of another embodiment of a canopy system on a building structure according to the present invention.

FIG. 2 shows another configuration of a building structure with columns 10 of increasing height and the supporting beam sections 12 at increased elevations so that the roof has a constant slope in which the panels transverse this slope. The hose 15 for supplying liquid to the inside of the panels 14 is provided at the side of the panel having the highest elevation so that liquid will flow to the lowest point in each panel 14. The building structure as illustrated in both FIGS. 1 and 2 is not complete, trusses, cross-braces and other members would be required. The construction of the structure may be steel, concrete, wood or the like. The building structure itself does not form part of the present invention, however, the particular beam section 12 having the connection 13 to support the panel 14 is an integral part of the present invention and is described in more detail hereinafter.

The tubular panel may be formed from an extruded tubular film of thermoplastic material such as polyethylene or polyester and may be transparent. If the building is to be used as a greenhouse, then the top exterior sheet and the bottom interior sheet of the panels may both be transparent to allow light and ultraviolet rays to enter the building. In other uses the top exterior sheet may be transparent, and the bottom interior sheet of the panel may be coated to become translucent and thus allowing ultraviolet rays and light to act on the environment within the panel, but not to enter the building. Various degrees of transmission of light and ultraviolet rays through the bottom interior sheet may be obtained depending upon what is required inside the building. The type and thickness of coating on this bottom interior sheet may be varied depending on the requirements.

In another embodiment the tubular panel is made from synthetic fabric, it may be woven in a continuous tube and then coated to become impervious to weather and ultra violet ray degradation. The tube is made with two side walls, a top exterior surface and a bottom interior surface, the height of the side walls may vary from 8 to 18 inches and the width of the panel may be up to 10 feet or more. The tube may be made in continuous lengths. The limitation only being the shipping as the tube may be rolled up and weight may become the limiting factor.

Other fabric materials suitable for manufacturing hollow sleeves may be made from glass fibers, metal fibers, fluorocarbon fibers, graphite fibers and saran fibers. Other suitable coating materials for fabrics include fluorocarbons and saran.

Bright polyester yarns in a scrim or a loose plain woven polyester fabric may be used with a clear coating resin preferably a silicone coating resin to provide a high light transmission value through the panel into the building. If a lower level of natural illumination is desired then the lower interior sheet is coated with a light absorbing material. Natural lighting in a work or recreational environment requires transmission of 8% to 16% of sunlight while food crop production requires the maximum possible transmission up to 80%.

The impermeable coating is a weatherable exterior finish and an interior vapor barrier. FIG. 3 shows one embodiment of a building panel 14 with a top exterior sheet 20, two side walls 21 and a bottom interior sheet 22. The panel 14 is supported by the beam sections 12, in four locations, two to each beam section at the joins between the side walls 21 and the top sheet 20 and bottom sheet 22. In the case of a tubular film this so called "join" represents the four locations where the panel 14 is supported by the beam sections 12. Such a "join" is not apparent when the tubular film is made as generally no seams are made in a tubular film. The "joins" are only defined after installation to define the sidewalls 21, top sheet 20 and bottom sheet 22. FIG. 3 shows rectangular corner bars 23 which extend within the top and bottom flanges of a channel section 24 and are held rigidly in place at each end to support the panel 14 at the four "joins" between the two beams 12. A hose 15 is shown at the side of the panel with the highest elevation. Jets or holes (not shown) are provided along the hose 15 so that liquid can be sprayed into the interior of the panel. FIG. 3 illustrates a panel having a positive pressure therein, that is, a pressure above atmospheric pressure, so that the walls 15, top sheet 20 and bottom sheet 22 bulge outwards. FIG. 4 on the other hand illustrates a panel having a negative pressure, or a pressure below atmospheric pressure, therein with the walls 21 top sheet 20 and bottom sheet 22 collapsed inwards, but having sufficient tension in the sheets so that they do not touch or restrict flow in the panel.

The panels 14 illustrated in FIG. 5 and FIG. 6 have an intermediate sheet 30 which divides the panel into two sealed compartments or hollow sleeves, a top sleeve 31 and a bottom sleeve 32. FIG. 5 illustrates both sleeves having a positive pressure therein. FIG. 6 illustrates the top sleeve 31 having a positive pressure therein and the bottom sleeve 32 having a negative pressure therein. FIG. 5 illustrates a liquid feed hose 15 in the bottom sleeve 32 only. FIG. 6 illustrates a liquid feed hose 15 in both hollow sleeves.

The environment within the panel is controlled depending on the requirements inside the building. Pressure, temperature, and humidity are all factors which can be controlled. In winter, heat may be supplied to the panel; in the summer heat can be removed from the hollow sleeve. Liquid, preferably water, can be evaporated within the hollow sleeve to remove heat. The evaporation occurs either at a positive pressure or a negative pressure depending on the temperature required. In one embodiment foam is injected from one end of the panel or alternatively may be produced by spraying a liquid under pressure through jets or holes in the hose 15 inside the panel. The foam improves the insulation within the panel. When two hollow sleeves are provided in a panel, foam may be injected into one sleeve to improve the insulation, and the other sleeve can have air circulating therein to control heat within the building.

Figure 8:
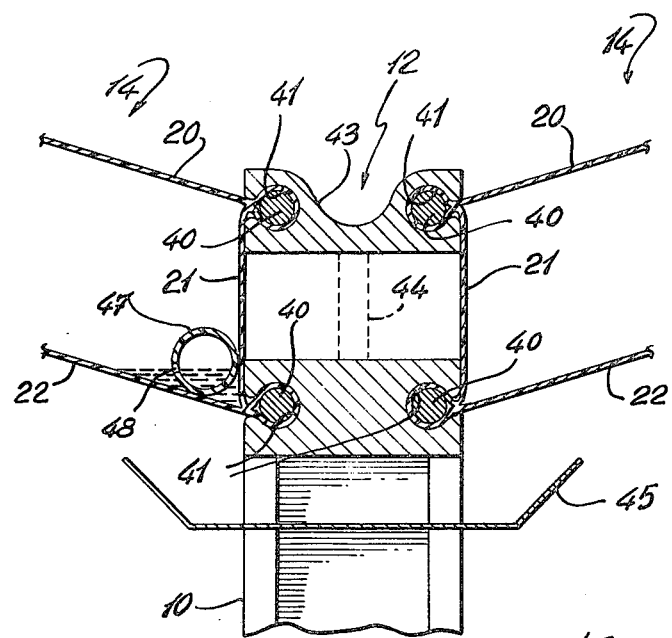
FIG. 8 is a partial sectional view of the building structure shown in FIG. 1 illustrating the trough of the roof supporting the sides at the lower elevation of two panels.

One example of a connection between a panel 14 and a connecting beam section 12 of a building is illustrated in FIGS. 7 and 8. FIG. 7 shows a peak connection for the building system shown in FIG. 1 wherein panels made of a woven fabric coated with an impervious coating have cords 40 sewn into the fabric or woven into the fabric at the joins between the top exterior sheet 20 and the side walls 21 and the bottom interior sheet 22 and the side walls 21. These cords 40 slide into fluted slots 41 which extend right along the connecting beam section 12 and hold the panel 14 to the building structure. The fluted slots 41 have a smooth interior to allow the cords 40 to be slid in place. The material surrounding the slots 41 may be plastic or metal but must have no sharp edges so that the panel material moves freely therein without catching or tearing. A cap 42 is provided on the peak of the building structure to drain the water from rain and the like. Similarly, a groove 43 with a drain 44 is provided in the trough as illustrated in FIG. 8 and the gutter 45 is provided beneath the trough to catch water from the roof. A hose 15 for liquid such as water, to spray into the panel is provided at the side having the higher elevation. The hose 15 is joined to the side wall 21 and has a plurality of jets or holes 46 along the length. FIG. 8 illustrates a drain pipe 47 having drain holes 48 therein. The drain pipe is not an essential feature of the canopy system, natural drainage to each end of the panel may be used. However, the drain pipe is used in long panels with a suction pump to pump out liquid along the length of the panel. Alternatively, a positive pressure within the panel forces liquid out through the drain.

Figure 9:
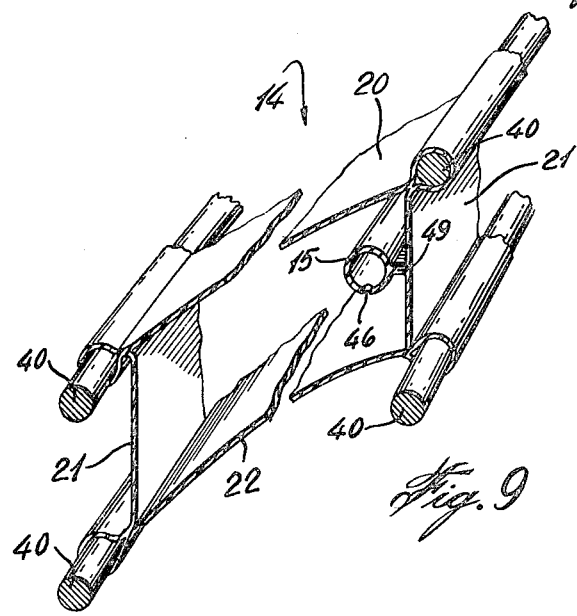
FIG. 9 is an isometric view partly in cross section of a tubular panel according to one embodiment of the present invention.

FIG. 9 illustrates one embodiment of a panel such as that shown in FIGS. 7 and 8, with cords 40 woven into the fabric of the sleeve at each join between the sidewalls 21, and the top sheet 20 and bottom sheet 22. The hose 15 has a fabric link 49 to the sidewall 21.

Figure 10:
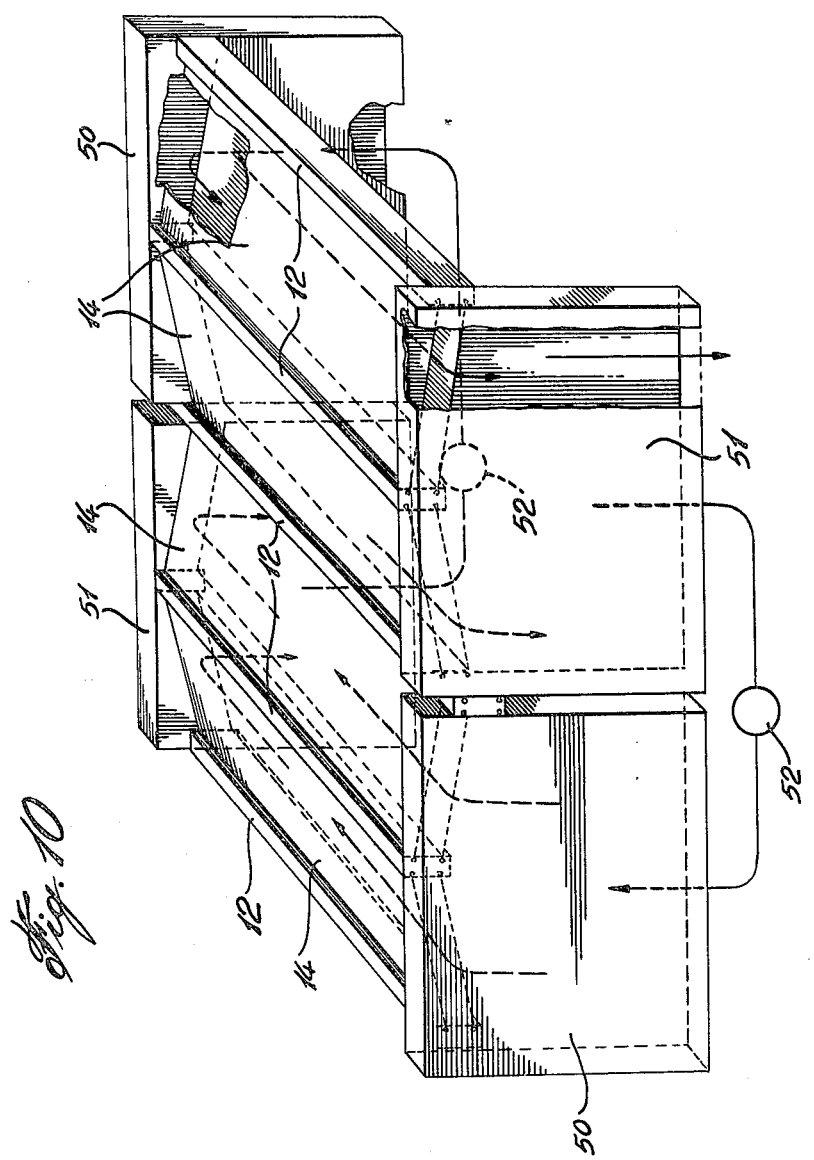
FIG. 10 is a schematic elevational view of a closed air circuit for the manifold system at the ends of the tubular panels of a roof.

Four panels 14 are illustrated in FIG. 10 similar to the roof configuration shown in FIG. 1 and having inlet manifolds 50 for two panels 14 and outlet manifolds 51 for two panels 14. A closed circuit air system is supplied where air to a first inlet manifold 50 passes through two of the panels 14 into a first outlet manifold 51 from whence the air passes in a closed circuit system 52 including a fan, a heat exchanger and a precipitator. The system ensures the required temperature, pressure and humidity of the air which then feeds into a second inlet manifold 50 on the same side as the first outlet manifold 50 and through the panels 14 to a second outlet manifold 51 and again through another closed circuit system 52 where the temperature, pressure and humidity are controlled, before feeding back into the first inlet manifold 50. Thus the closed air system is able to control the pressure of the air entering the panel, the moisture content of the air within the panel, and the temperature of the air within the panel. Liquid may be sprayed into the panel through the hose 15 to provide cooling, or alternatively foam may be generated to fill the panels of the canopy system by entrainment of the air within the panel with the liquid sprayed into the panel either through the hose 15 or in short panels from the inlet manifold end. Upon ceasing to be generated the foam can be destroyed either by blowing through the panel from the inlet manifold, or spraying with a foam dissolving liquid from the hose 15. The temperaure control, humidity control, foam insulation control, and pressure control of the system does not form part of the present invention.

Various changes may be made to the particular details of the connection between the panel and the connection beam sections of the building structure. The panel is supported at four corners such that if there is a negative pressure within the panel the top sheet and the bottom sheet do not touch each other or prevent the movement of air through the panel from end to end. The pressure, either negative or positive, has to be arranged so that it is feasible for operation of the panel. Too high a pressure would result in the possibility of leaks occurring as would too low a pressure. Other changes to the canopy system may be made without departing from the scope of the present invention which is limited only by the claims.

The embodiments of the invention in which an exclusive property or privilege is claimed are defined as follows:

1. A canopy system for a building structure comprising at least one tubular panel formed of flexible impermeable sheet material, the panel including an open ended hollow sleeve with two side walls, a top exterior sheet and a bottom interior sheet being joined, sealed and having support means at the joins between the side walls and the top and bottom sheets, the top and bottom sheets extending across and separately supported by the support means at each side of the panel by the building structure, one supported side of the panel being at a higher elevation than the other supported side of the panel, a pressure manifold system to which each end of the open ended hollow sleeve is joined and through which air is circulated to control the pressure within the panel, and liquid feed means for delivering a liquid within the panel at the supported side of the panel having the higher elevation such that the liquid flows transversely to the circulated air flow.

2. The canopy system according to claim 1 wherein the manifold system at each end of the hollow sleeve forms part of a closed air circuit and includes air moving means, heat exchanger means and precipitator means within the manifold system.

3. The canopy system according to claim 1 wherein the top exterior sheet of the hollow sleeve is formed from material which allows the transmission of solar energy into the panel.

4. The canopy system according to claim 1 wherein the top exterior sheet and the bottom interior sheet of the hollow sleeve are formed from material which allows the transmission of solar energy into the panel and inside the building structure.

5. The canopy system according to claim 4 wherein the bottom interior sheet of the hollow sleeve is formed from material having a selected light transmission to suit the light requirements inside the building structure.

6. The canopy system according to any of claims 1, 2 or 3 wherein the hollow sleeve is formed from a tubular film of thermoplastic material selected from the group consisting of polyethylene and polyester.

7. The canopy system according to claim 1 wherein the sheet material is a synthetic fabric having an impermeable coating thereon.

8. The canopy system according to claim 7 wherein the synthetic fabric is a loose plain woven polyester fabric with a flexible silicone coating thereon.

9. The canopy system according to claim 7 or claim 8 wherein the liquid feed means is a hose having a plurality of holes along its length and is connected to the fabric at the side of the panel being at the higher elevation.

10. The canopy system according to claim 7 or claim 8 wherein the support means of the joins between the side walls and the top and bottom sheets comprises a cord at each of the joins woven into the fabric adapted to be held in fluted slots forming part of the building structure.

11. The canopy system according to any of claims 1, 2 or 7 including a liquid drain pipe located within the panel at its lowest elevation.

12. The canopy system according to any of the claims 1, 2 or 7 wherein a positive pressure is maintained within the panel.

13. The canopy system according to any of claims 1, 2 or 7 wherein a negative pressure is maintained within the panel.

14. The canopy system according to claim 1 including at least one additional sheet between the top exterior sheet and the bottom interior sheet, the additional sheet joined and sealed to the sides of the panel to form at least two hollow sleeves.

15. The canopy system according to claim 1 wherein a plurality of tubular panels are supported side by side by the building structure.

16. The canopy system according to claim 15 wherein the sides at the higher elevation of adjacent panels are contingent with each other, the sides at the lower elevation of adjacent panels are contingent with each other, and the building structure has elements which support the sides at the higher elevation of adjacent panels and other elements which support the sides at the lower elevation of adjacent panels to form a roof with peaks and troughs.

17. The canopy system according to claim 15 wherein the side at the higher elevation of one panel is contingent with the side at the lower elevation of an adjacent panel and the building structure has elements each one of which supports the side at the higher elevation of one panel and the side at the lower elevation of an adjacent panel to form a roof of constant slope in which the panels transverse the slope.

* * * * *